(12) United States Patent
Nakayama et al.

(10) Patent No.: US 8,212,656 B2
(45) Date of Patent: Jul. 3, 2012

(54) VEHICLE PRESENCE NOTIFICATION APPARATUS

(75) Inventors: Toshiaki Nakayama, Miyoshi (JP); Toshio Hayashi, Obu (JP)

(73) Assignee: Denso Corporation, Kariya (JP)

( * ) Notice: Subject to any disclaimer, the term of this patent is extended or adjusted under 35 U.S.C. 154(b) by 206 days.

(21) Appl. No.: 12/839,628

(22) Filed: Jul. 20, 2010

(65) Prior Publication Data

US 2011/0032087 A1 Feb. 10, 2011

(30) Foreign Application Priority Data

Aug. 7, 2009 (JP) ................. 2009-185186

(51) Int. Cl.
*G08B 3/00* (2006.01)
*G08G 1/16* (2006.01)
*B60Q 1/00* (2006.01)
*G01S 15/00* (2006.01)

(52) U.S. Cl. ............... 340/384.1; 340/425.5; 340/436; 340/435; 340/443; 340/441; 340/903; 340/936; 340/944; 367/89; 367/91; 367/93; 367/909; 180/169; 701/22

(58) Field of Classification Search ............... 340/384.1, 340/443
See application file for complete search history.

(56) References Cited

U.S. PATENT DOCUMENTS

| 5,334,983 | A | | 8/1994 | Ikeda et al. |
| 5,358,318 | A | | 10/1994 | Ikeda et al. |
| 5,475,620 | A | * | 12/1995 | Kuzuya et al. ........... 702/143 |
| 2007/0257783 | A1 | | 11/2007 | Matsumoto et al. |

FOREIGN PATENT DOCUMENTS

| JP | H2-35084 U | 3/1990 |
| JP | H5-157832 | 6/1993 |
| JP | 10-201001 | 7/1998 |
| JP | P2003-118476 A | 4/2003 |
| JP | P2003-307564 A | 10/2003 |
| JP | P2005-333573 A | 12/2005 |
| JP | P2006-162328 A | 6/2006 |
| JP | 2007-237831 | 9/2007 |
| JP | 2007-328603 | 12/2007 |

OTHER PUBLICATIONS

Japanese Office Action dated Apr. 26, 2011, issued in corresponding Japanese Application No. 2009-185186 with English Translation.

* cited by examiner

*Primary Examiner* — Donnie Crosland
(74) *Attorney, Agent, or Firm* — Nixon & Vanderhye PC (57) ABSTRACT

A vehicle presence notification apparatus generates a notice sound by emitting an ultrasonic wave in mid air based on an ultrasonic signal modulated according to an audible sound. During proceeding in mid air, the modulated ultrasonic wave is self-demodulating to become an audible sound. The audible sound posterior to the self-demodulation has a significant directionality like the ultrasonic wave. The notice sound is thus conveyed mainly to a pedestrian who is present in a dangerous area range where a danger needs to be taught. In addition, the vehicle presence notification apparatus includes a sensor-use ultrasonic transducer device having a transducers. The transducer device serves as a vehicle velocity sensor by transmitting an ultrasonic wave towards a road surface based on an ultrasonic wave signal or modulated ultrasonic wave, thereby enabling the vehicle presence notification apparatus to acquire vehicle velocity information by itself.

2 Claims, 5 Drawing Sheets

VEHICLE PRESENCE NOTIFICATION APPARATUS

CROSS REFERENCE TO RELATED APPLICATION

The present application is based on and incorporates herein by reference Japanese Patent Application No. 2009-185186 filed on Aug. 7, 2009.

FIELD OF THE INVENTION

The present invention relates to a vehicle presence notification apparatus for notifying a person, such as a pedestrian outside a subject vehicle or an occupant in another vehicle, of a presence or approach of the subject vehicle.

BACKGROUND OF THE INVENTION

[Patent document 1] JP-2006-199110 A (US 2007/257783 A1)
[Patent document 2] JP-H10-201001 A Patent documents 1, 2 describe a vehicle presence notification apparatus. At the time of traveling of an electric vehicle or at the time of motor drive traveling of a hybrid vehicle, it may be desired that a person outside of the vehicle can recognize the presence of the vehicle approaching. To that end, an audio speaker is installed in the vehicle to thereby produce a notice sound outside of the vehicle such as a false engine sound and a false running sound for teaching the presence of the vehicle.

However, since the notice sound outputted from the audio speaker is diffused around, it may be heard by a pedestrian (for example, a pedestrian who is present in the back of the vehicle which advances forward) who is not present in the dangerous position, or a person who is in a vehicle compartment. Thus, the sense of discomfort may be given to other than a pedestrian who is present in the dangerous position.

In addition, in such a vehicle presence notification apparatus, a sound generated from the vehicle such as a noise from tires changes depending on a vehicle velocity. It is thus necessary to change the notice sound according to the vehicle velocity. Accordingly, necessary vehicle velocity information is conventionally acquired from a body ECU of the vehicle. However, this poses a problem to require time and expense in order to retrieve a vehicle velocity signal from the body ECU.

SUMMARY OF THE INVENTION

The present invention is made so as to address the above problem. It is an object of the present invention to provide a technology in which a notice sound for teaching a presence of a vehicle approaching is designed to be conveyed to a pedestrian or the like who needs to be notified of the presence of a danger. Thereby, the sense of discomfort due to the notice sound can be reduced for a pedestrian, who is not present in a dangerous place or a person who is inside of a vehicle compartment. In addition, the vehicle presence notification apparatus is further provided to acquire vehicle velocity information by itself without need of retrieving a vehicle velocity signal from a body ECU of the vehicle.

To achieve the above object, as an example of the present invention, a vehicle presence notification apparatus is provided as follows. An ultrasonic signal generation section is configured to output an ultrasonic signal. A modulation section is configured to use the ultrasonic signal as a carrier wave and modulate the ultrasonic signal depending on an audible sound. A notice sound-use ultrasonic transducer device is configured to generate a notice sound by emitting an ultrasonic wave in mid air based on the ultrasonic signal modulated by the modulation section.

Under such a configuration, as proceeding in mid air, the modulated ultrasonic wave is self-demodulated to thereby become an audible sound. The audible sound posterior to the self-demodulation has a significant directionality like the ultrasonic wave. Thus, the notice sound can be conveyed mainly to a pedestrian who is present in an area range where a danger needs to be taught. Further, the sense of discomfort due to the notice sound can be reduced for a pedestrian, who is not present in a dangerous place or a person who is inside of a vehicle compartment. In addition, by the help of directionality, a sound can be conveyed to an area range where a potential danger needs to be taught. Even a compact ultrasonic transducer device can properly satisfy a function to report the presence of a subject vehicle. In addition, the ultrasonic wave has a characteristic to relatively easily to attenuate; thus, the audible sound posterior to the self-demodulation similarly easily attenuates. The notice sound therefore does not reach a pedestrian or another vehicle which is separated distantly from the subject vehicle; thus, the notice sound may not be treated as noise.

In addition, the above vehicle presence notification apparatus further includes a velocity sensor-use ultrasonic transducer device that functions as a vehicle velocity sensor by transmitting an ultrasonic wave to a road surface based on the ultrasonic signal emitted by the ultrasonic generation section or the ultrasonic signal modulated by the modulation section.

Under such a configuration, a vehicle velocity can be measured by the vehicle presence notification apparatus itself; based on the corresponding vehicle velocity information, the vehicle presence notification apparatus can be controlled. Accordingly, even when the vehicle presence notification apparatus is installed in a vehicle, which was sold and has been already used in the market, it is unnecessary to prepare parts or work for retrieving a vehicle velocity signal from the body ECU inside the vehicle. The vehicle presence notification apparatus can be easily installed to a vehicle which was sold and used in the market.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

According to an aspect of the present disclosure, a vehicle presence notification apparatus is provided as follows. An ultrasonic signal generation section is configured to output an ultrasonic signal. A modulation section is configured to use the ultrasonic signal as a carrier wave and modulate the ultrasonic signal depending on an audible sound. A notice sound-use ultrasonic transducer device is configured to generate a notice sound by emitting an ultrasonic wave in mid air based on the ultrasonic signal modulated by the modulation section. A velocity sensor-use ultrasonic transducer device is configured to function as a vehicle velocity sensor by transmitting an ultrasonic wave to a road surface based on the ultrasonic signal emitted by the ultrasonic generation section or the ultrasonic signal modulated by the modulation section.

As an optional aspect of the above vehicle presence notification apparatus, the velocity sensor-use ultrasonic transducer device may include at least a first ultrasonic transducer and a second ultrasonic transducer, both of which transmit and receive an ultrasonic wave, and an arrangement position of the first ultrasonic transducer may be anterior to an arrangement position of the second ultrasonic transducer in a forward-and-rearward direction of the vehicle.

Furthermore, an ultrasonic wave transmitted towards downward of the vehicle by the first ultrasonic transducer may be reflected on a road surface; the reflected ultrasonic wave may be received by the second ultrasonic transducer. An ultrasonic transmitted towards downward of the vehicle by the second ultrasonic transducer may be reflected on a road surface; the reflected ultrasonic wave may be received by the first ultrasonic transducer. Herein, a first duration may be defined as a duration from when an ultrasonic wave is transmitted by the first ultrasonic transducer to when the ultrasonic wave, which is transmitted by the first ultrasonic transducer and then reflected on a road surface, is received by the second ultrasonic transducer; in contrast, a second duration may be defined as a duration from when an ultrasonic wave is transmitted by the second ultrasonic transducer to when the ultrasonic wave, which is transmitted by the second ultrasonic transducer and then reflected on a road surface, is received by the first ultrasonic transducer. A vehicle velocity of the vehicle may be thereby measured based on the first duration and the second duration.

As another optional aspect of the above vehicle presence notification apparatus, the velocity sensor-use ultrasonic transducer device may be further configured to emit the modulated ultrasonic wave towards at least one of a vehicle rearward direction of the vehicle or a vehicle forward direction of the vehicle.

Under such a configuration, the velocity sensor-use ultrasonic transducer device for measuring a vehicle velocity can be also used to actively generate a notice sound within an area range in at least one of a vehicle forward direction and a vehicle rearward direction of the vehicle.

Configuration of First Embodiment

A configuration of a vehicle presence notification apparatus 1 according to a first embodiment of the present invention is explained using FIGS. 1A and 1B, FIGS. 2A to 2E, and FIG. 3. The vehicle presence notification apparatus 1 is mounted in a subject vehicle 2. The vehicle presence notification apparatus 1 generates a notice sound (a false engine sound, a false travel sound, etc.) for performing a notification, announcement, or report, for instance, at the time of traveling of an electric vehicle 2 or the motor drive traveling of a hybrid vehicle 2 so as to make a person outside of the vehicle 2 notice or recognize the vehicle 2 approaching.

Figure 1A:
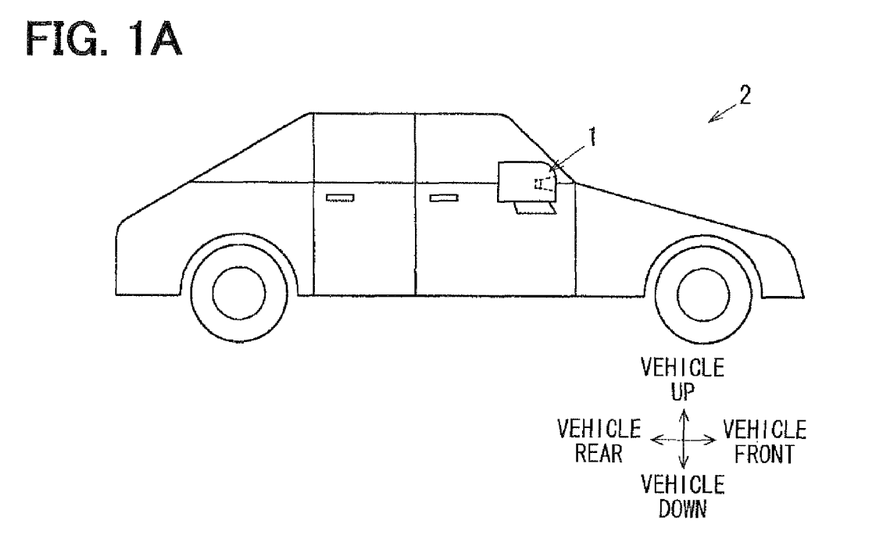
FIG. 1A is a diagram illustrating a vehicle which is equipped with a vehicle presence notification apparatus according to a first embodiment of the present invention.
Figure 1B:
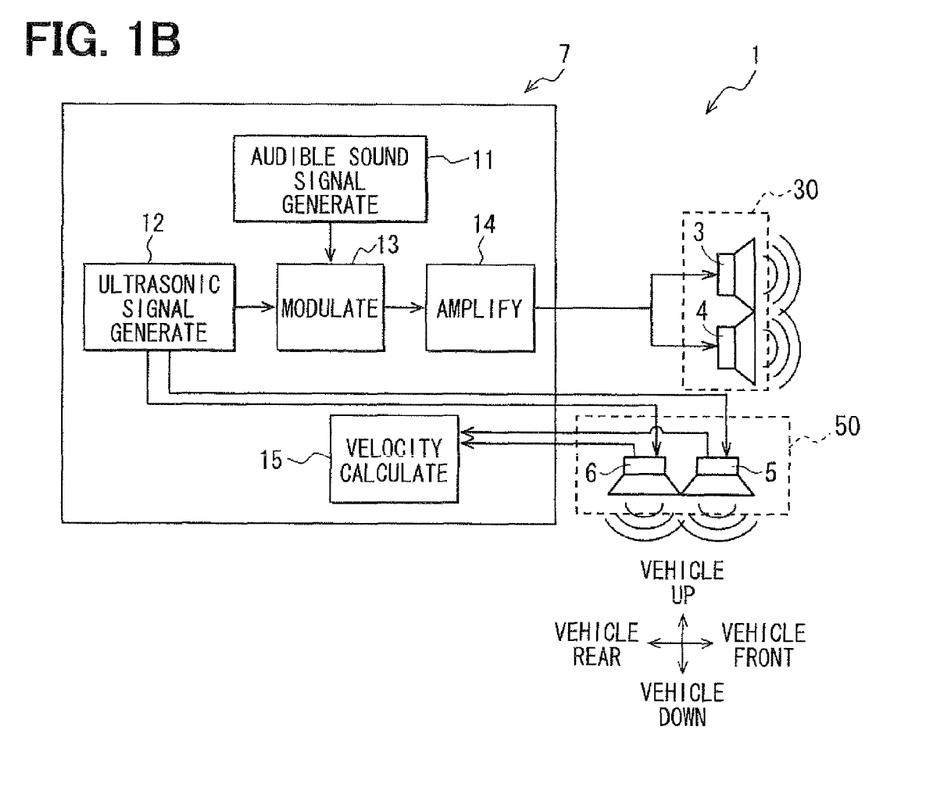
FIG. 1B is a block diagram illustrating the vehicle presence notification apparatus according to the first embodiment.
Figure 2A:
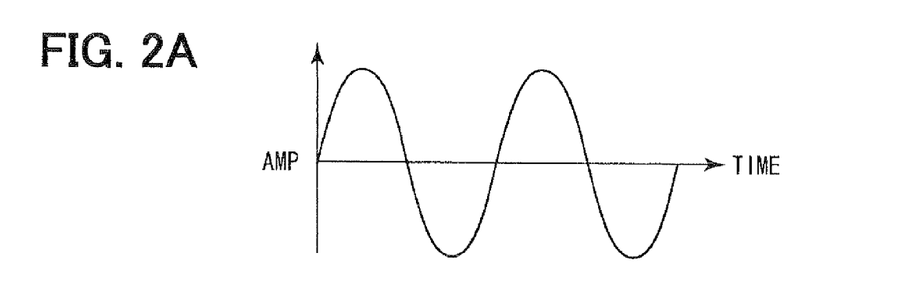
FIGS. 2A to 2E are diagrams for explaining a principle of an audible sound emission by the vehicle presence notification apparatus according to the first embodiment.
Figure 2B:
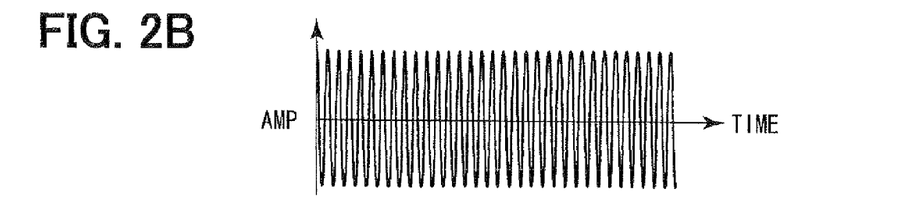
Figure 2C:
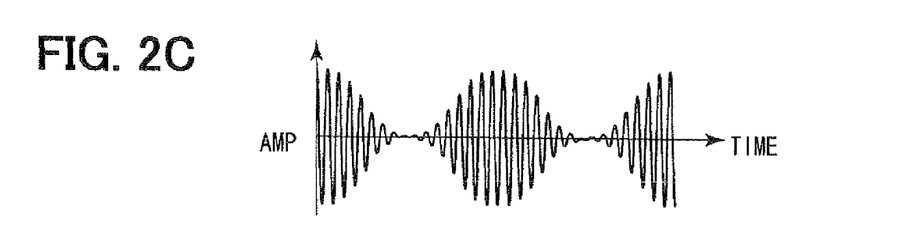
Figure 2D:
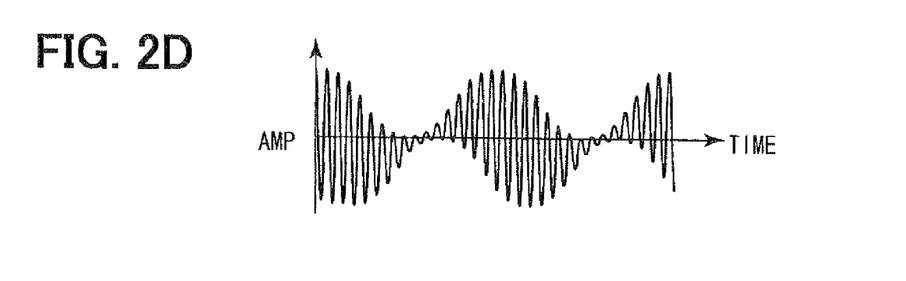
Figure 2E:
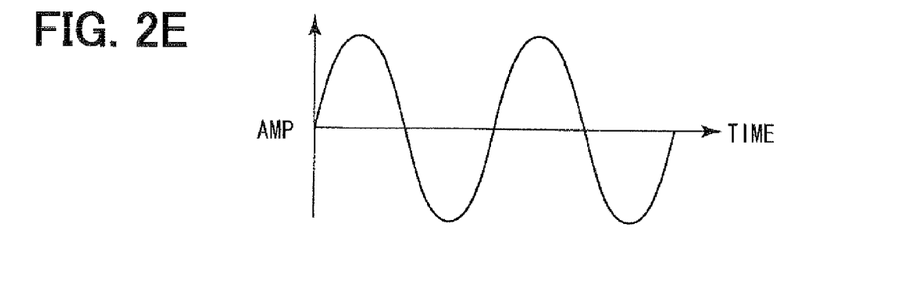

The vehicle presence notification apparatus 1 is attached to a door mirror of the vehicle 2, for example. The vehicle presence notification apparatus 1 includes the following: an ultrasonic transducer device 30 (hereinafter referred to as a notice sound-use transducer device 30) having ultrasonic transducers 3, 4 (hereinafter each referred to also as a notice sound-use transducer 3, 4) dedicatedly used for generating notice sounds; an ultrasonic transducer device 50 (hereinafter referred to as a velocity sensor-use ultrasonic transducer device 50) having ultrasonic transducers 5, 6 (hereinafter, each referred to also as a velocity sensor-use ultrasonic transducer 5, 6) used for measuring a vehicle velocity of the vehicle; and a microcomputer 7 as a control circuit 7 which supplies an electric power to each vibrator (not shown) of the notice sound-use transducers 3, 4, and the velocity sensor-use transducers 5, 6 and controls a movement of each vibrator.

Each ultrasonic transducer 3 to 6 transforms an electrical signal such as a voltage, which is inputted into the vibrator, into a mechanical vibration. Using the mechanical vibration, a sonic wave which vibrates on the frequency of the ultrasonic range is generated. The notice sound-use ultrasonic transducers 3, 4 are used only for transmission of ultrasonic waves. In contrast, the velocity sensor-use ultrasonic transducers 5, 6 are used for reception of ultrasonic waves in addition to the transmission of ultrasonic waves.

Each of the notice sound-use transducers 3 and 4 is arranged such that the direction (hereinafter referred to as a vibration direction) in which the vibrator vibrates is a vehicle forward direction (i.e., a heading direction of the vehicle). Each of the velocity sensor-use transducers 5, 6 is arranged such that the vibration direction is a vehicle downward direction (i.e., a direction going towards downward of the vehicle).

Furthermore, the microcomputer 7 is configured to contain a known microcomputer having: a CPU having a control function and a computation function; various kinds of storage devices such as ROM and RAM; an input device; and an output device.

The microcomputer 7 contains or functions as an audible sonic wave signal generation means or section 11 to output a wave signal of an audible sound (called an audible sonic wave signal, refer to FIG. 2A), which is intended to be reproduced; an ultrasonic signal generation means or section 12 to output an ultrasonic signal (refer to FIG. 2B); a modulation means or section 13 to use an ultrasonic signal as a carrier wave and modulate the ultrasonic signal depending on an audible sonic wave signal; and an amplification means or section 14 to amplify the signal outputted from the modulation section 13 (refer to FIG. 2C) to the extent that the notice sound-use transducers 3, 4 can be driven.

In the notice sound-use transducers 3, 4 driven by the microcomputer 7, the vibrator of each of the notice sound-use transducers 3, 4 vibrates based on the modulated ultrasonic wave (wave posterior to modulation or wave undergoing modulation); thereby, the wave posterior to modulation is emitted into mid air.

In a duration that the wave posterior to modulation emitted into the air is proceeding in the air, the following takes place. That is, the waveform is distorted due to the nonlinear characteristics of the air (refer to FIG. 2D), and then an audible sound based on the original audible sonic wave signal appears due to the self-demodulation (refer to FIG. 2E); thereby being recognized by a pedestrian, etc. as a notice sound.

The velocity sensor-use transducer device 50 containing the transducers 5, 6 is used as a vehicle velocity measurement sensor. The next explains a principle of the vehicle velocity measurement using the velocity sensor-use transducers 5, 6 using FIG. 3.

Figure 3:
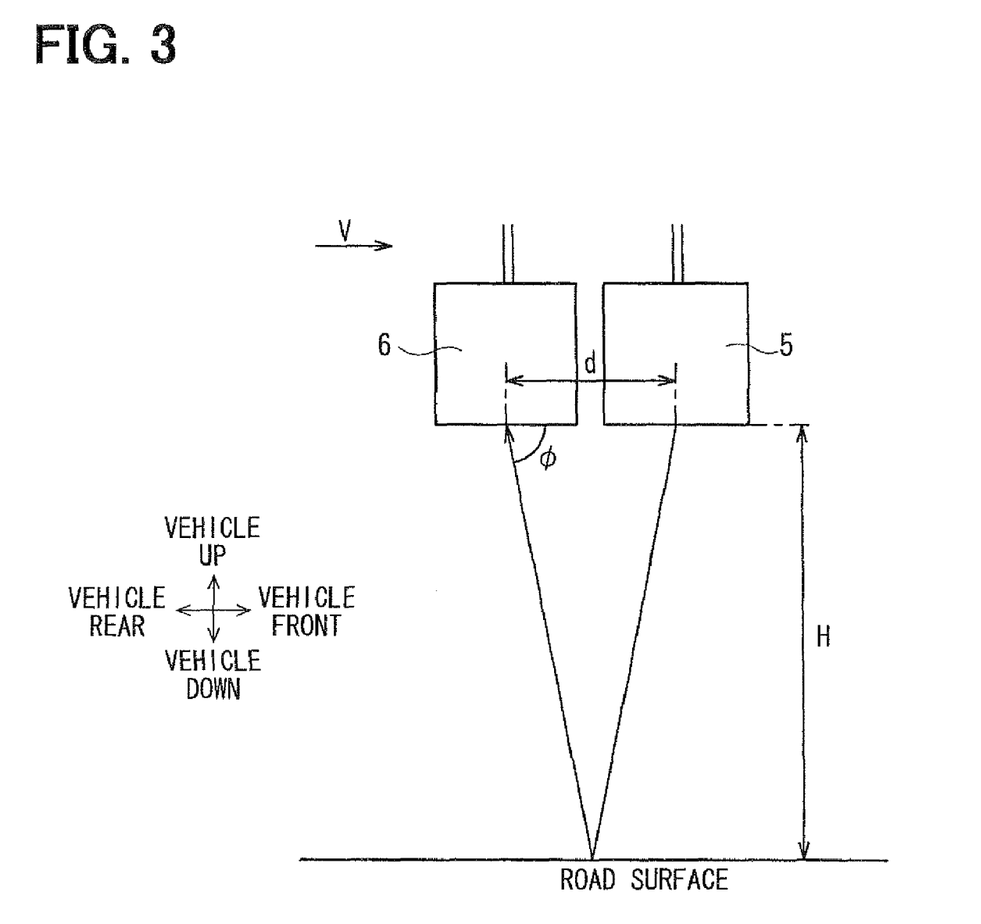
FIG. 3 is a diagram for explaining a principle of a vehicle velocity measurement using ultrasonic transducers according to the first embodiment.

The velocity sensor-use transducer 5 is arranged in a position anterior to (forward of) the velocity sensor-use transducer 6 in a vehicle forward-and-rearward direction (i.e., a vehicle longitudinal direction). In the velocity sensor-use transducers 5, 6, the respective vibrators vibrate according to the ultrasonic signal outputted by the ultrasonic signal generation section 12, thereby emitting or transmitting an ultrasonic wave.

The velocity sensor-use transducer 5 transmits the ultrasonic wave towards downward of the vehicle; the transmitted ultrasonic wave is reflected on a road surface. The reflected wave is then received by the velocity sensor-use transducer 6 (arrow in FIG. 3). In contrast, the velocity sensor-use transducer 6 transmits the ultrasonic wave towards downward of the vehicle; the transmitted ultrasonic wave is reflected on a road surface. The reflected wave is then received by the velocity sensor-use transducer 5.

The ultrasonic reception signals in the velocity sensor-use transducers 5, 6 are outputted to a vehicle velocity calculation means or section 15, which is included in the microcomputer 7; thereby, the vehicle velocity is calculated according to the reception signals.

That is, a first time (i.e., duration) T1 is defined as a duration from a time when an ultrasonic wave is transmitted by the velocity sensor-use ultrasonic transducer 6 to a time when the ultrasonic wave, which is transmitted by the velocity sensor-use ultrasonic transducer 6 and then reflected on a road surface, is received by the velocity sensor-use ultrasonic transducer 5. In contrast, a second time (i.e., duration) T2 is defined as a duration from a time when an ultrasonic wave is transmitted by the velocity sensor-use ultrasonic transducer 5 to a time when the ultrasonic wave, which is transmitted by the velocity sensor-use ultrasonic transducer 5 and then reflected on a road surface, is received by the velocity sensor-use ultrasonic transducer 6. The following expression (1) is satisfied.

$$1/T1-1/T2=\{(C+V\cos\phi)-(C-V\cos\phi)\}/L \qquad (1)$$

Herein, C is a sonic velocity; V is a vehicle velocity; and L is a shortest distance of a reflection path which is traveled by an ultrasonic wave from the transmitting velocity sensor-use transducer 5 to the receiving velocity sensor-use transducer 6 via a reflection position on a road surface. The relation of three positions of the reflection position, the position of the vibrator of the velocity sensor-use transducer 5, and the position of the vibrator of the velocity sensor-use transducer 6 is provided as an isosceles triangle having the reflection position as a vertex. Herein, $\phi$ is an angle of the basic angle of the isosceles triangle. In addition, both L and $\phi$ can be obtained from a distance d between the vibrator of the velocity sensor-use transducer 5 and the vibrator of the velocity sensor-use transducer 6, and a height H of the transducers 5, 6 from the road surface, as shown in FIG. 3.

The vehicle velocity V is calculated by the following expression (2) using the expression (1).

$$V=L/2\cos\phi\times(1/T1-1/T2) \qquad (2)$$

Under the above configuration, the vehicle velocity calculation section 15 calculates a vehicle velocity V by the above expression (2) using the first time T1 and the second time T2 up to the time when the ultrasonic wave is detected by each of the velocity sensor-use transducers 5, 6. Then, according to the vehicle velocity V, the drive of the audible sonic wave signal generation section 11 or ultrasonic signal generation section 12 is controlled.

Effect of First Embodiment

The vehicle presence notification apparatus 1 according to the present first embodiment includes an ultrasonic signal generation section 12 that outputs an ultrasonic signal; a modulation section 13 that uses an ultrasonic signal as a carrier wave and modulates the ultrasonic signal depending on an audible sound; and a notice sound-use transducer device 30 that contains notice sound-use transducers 3, 4 and generates a notice sound by emitting an ultrasonic wave in mid air based on the demodulated ultrasonic signal.

Under such a configuration, as proceeding in the air, the modulated ultrasonic wave is self-demodulated and becomes an audible sound. The audible sound posterior to the self-demodulation has a significant directionality like the ultrasonic wave. The notice sound is thus conveyed mainly to a pedestrian who is present in a dangerous area range where a danger needs to be taught.

Therefore, the sense of discomfort due to the notice sound can be reduced or relieved with respect to a pedestrian, who is not present in a dangerous place or a person who is inside of a vehicle compartment. In addition, by the help of directionality, the notice sound can be conveyed to the area range where the potential danger needs to be taught. Even a compact ultrasonic transducer device can properly satisfy a function to report the presence of the subject vehicle.

In addition, the ultrasonic wave has a characteristic to relatively easily to attenuate; thus, the audible sound posterior to the self-demodulation similarly easily attenuates. The notice sound does not reach a pedestrian or another vehicle which is separated distantly from the vehicle 2; thus, the notice sound may not be treated as useless noise.

In addition, the vehicle presence notification apparatus 1 further includes a velocity sensor-use transducer device 50, which functions as a vehicle velocity sensor and contains velocity sensor-use transducers 5, 6. According to such a configuration, the vehicle velocity can be measured by the vehicle presence notification apparatus 1 alone or itself. According to the vehicle velocity information, the vehicle presence notification apparatus 1 can be controlled. Accordingly, even when the vehicle presence notification apparatus is installed in a vehicle 2, which was sold and has been already used in the market, it is unnecessary to prepare parts or work for retrieving a vehicle velocity signal from the body ECU of the vehicle 2. The vehicle presence notification apparatus 1 can be easily installed to a vehicle which was sold and used in the market.

Configuration of Second Embodiment

Figure 4:
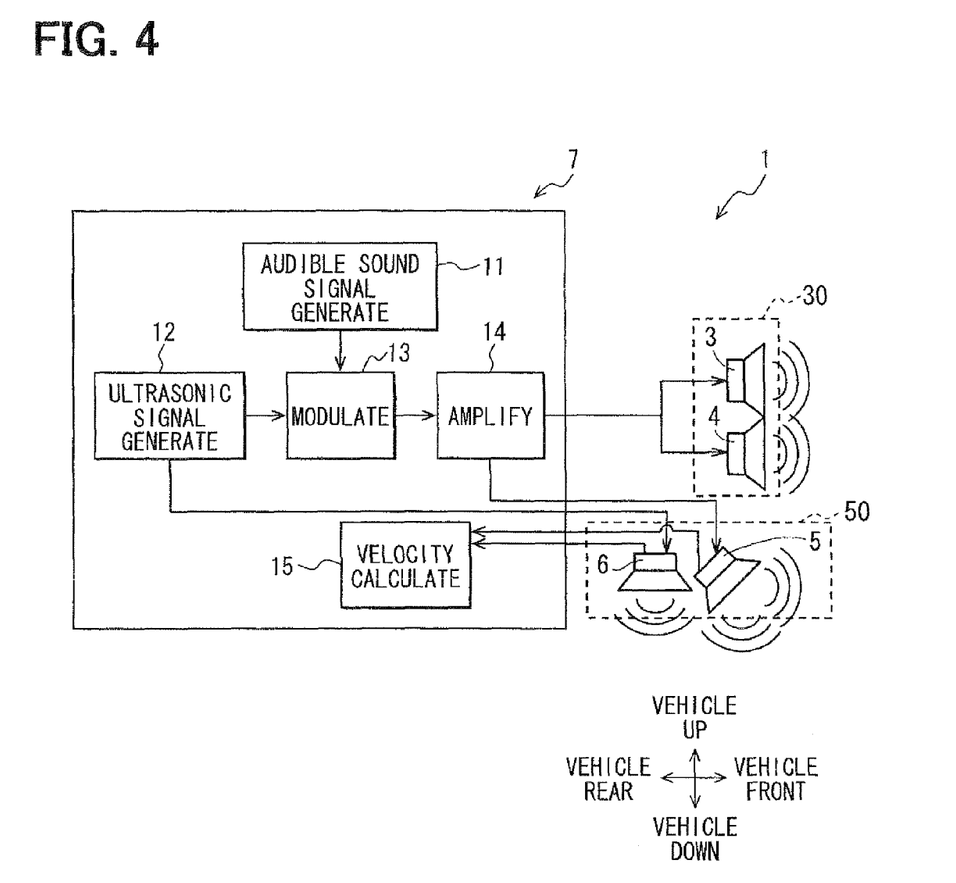
FIG. 4 is a block diagram illustrating a vehicle presence notification apparatus according to a second embodiment of the present invention.
Figure 5:
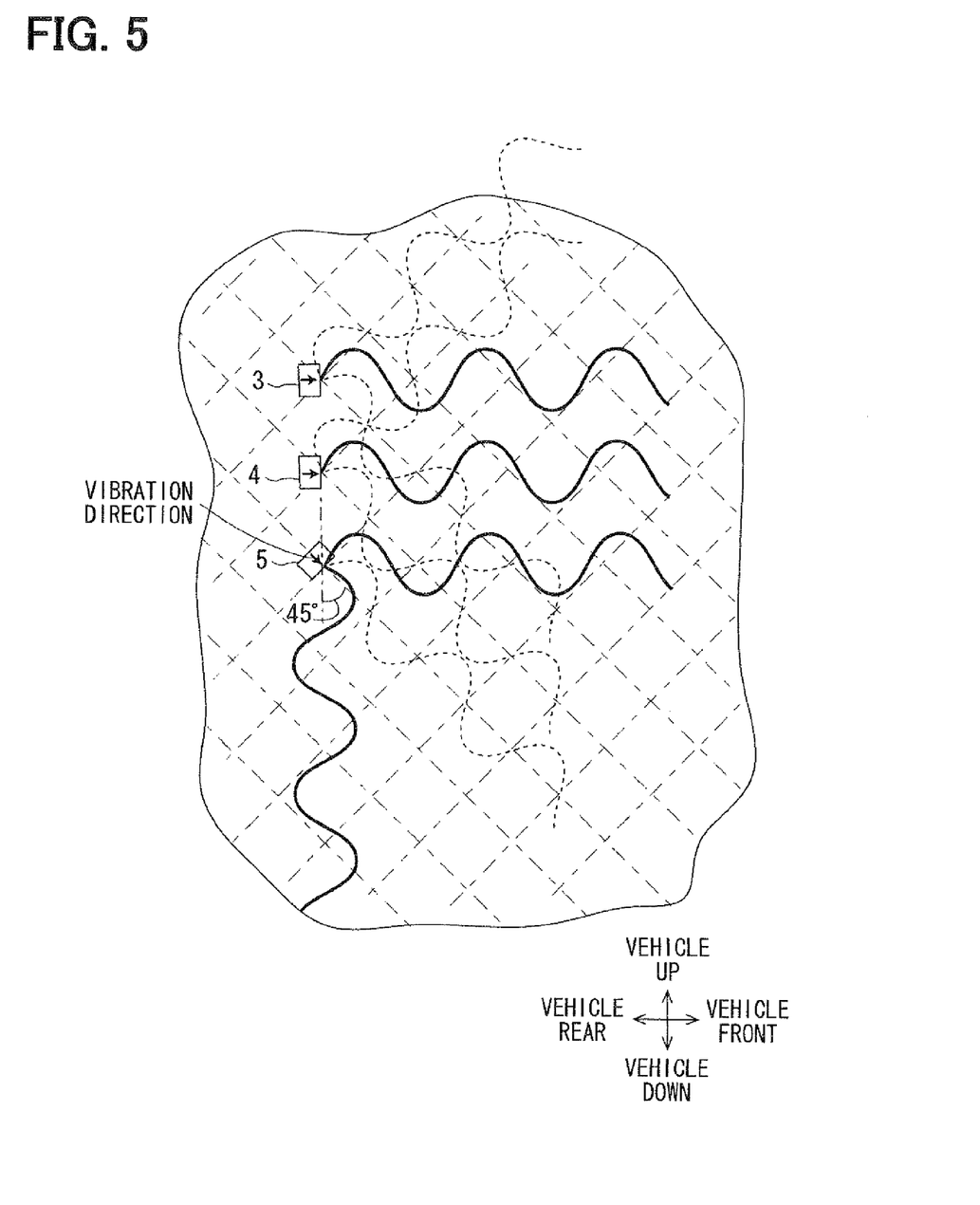
FIG. 5 is a diagram illustrating a state of amplification with respect to sonic waves from each ultrasonic transducer of the vehicle presence notification apparatus according to the second embodiment.

A configuration of a vehicle presence notification apparatus 1 according to a second embodiment of the present invention is explained mainly with respect to a difference from the first embodiment using FIGS. 4, 5. In the present embodiment, the velocity sensor-use transducer 5 of the velocity sensor-use transducer device 50 is provided such that the vibration direction in which the vibrator of the sensor-use transducer 5 vibrates is tilted downward by an angle of 45 degrees with respect to the vehicle forward direction (i.e., the heading direction of the vehicle).

In addition, in the present embodiment, the vibrator in the transducer 5 vibrates based on the ultrasonic (modulated wave) signal which is modulated like in the notice sound-use transducers 3, 4. In addition, the microcomputer 7 controls the drive of each of the notice sound-use transducers 3, 4 and the velocity sensor-use transducer 5 such that each transducer 3, 4, 5 emits a sonic wave having an identical frequency and an identical phase. According to such a configuration, as illustrated in FIG. 5, a part of the sonic wave emitted from the velocity sensor-use transducer 5 proceeds forward of the vehicle (i.e., towards the vehicle forward direction or goes to the vehicle front) because of the interference of sonic waves.

The direction in which the vibrator of the notice sound-use transducer 4 adjacent to the velocity sensor-use transducer 5 vibrates is towards forward of the vehicle, i.e., goes to the vehicle front. That is, the sonic wave emitted toward the vehicle front and the sonic wave emitted towards downward by an angle of 45 degrees with respect to the vehicle forward direction accord with each other in respect of tops and bottoms of the amplitude. As a result, the sonic wave is amplified in the vehicle front and the notice sound posterior to the self-demodulation can be heard loudly; thus, the notice sound can be directed to the vehicle front.

The sonic wave which goes upward and downward by an angle of 45 degrees with respect to the vibration direction (i.e., vehicle forward direction) of the notice sound-use transducer 4 is canceled by the interference between the sonic wave which goes upward and downward by an angle of 45 degrees with respect to the vibration direction (i.e., vehicle forward direction) of the notice sound-use transducer 3 and the sonic wave which goes towards the vibration direction of the vibrator of the velocity sensor-use transducer 5.

in addition, since the velocity sensor-use transducer 5 of the velocity sensor-use transducer device 50 is provided such that the vibration direction of the transducer 5 is tilted downward by an angle of 45 degrees with respect to the vehicle forward direction (i.e., heading direction of the vehicle), a part of the ultrasonic wave transmitted by the velocity sensor-use transducer 5 certainly reaches a road surface and the reflection wave reflected on the road surface can be received by the velocity sensor-use transducer 6. Furthermore, the reflection wave generated by the reflection on the road surface of the ultrasonic wave transmitted from the velocity sensor-use transducer 6 is also receivable with the velocity sensor-use transducer 5. Therefore, the vehicle velocity can be measured by using the velocity sensor-use transducer device 50 containing the velocity sensor-use transducer 5 and the velocity sensor-use transducer 6 according to the second embodiment, like in the first embodiment.

Effect of Second Embodiment

In the vehicle presence notification apparatus 1 according to the present second embodiment, the velocity sensor-use transducer 5 emits the modulated sonic wave towards the vehicle forward direction. According to such a configuration, a notice sound can be also generated actively by the velocity sensor-use transducer 5. That is, the velocity sensor-use transducer 5 can be designed to serve also as a notice sound-use transducer.

Modification

In the second embodiment, only the velocity sensor-use transducer 5 of the velocity sensor-use transducer device 50 is arranged to be tilted by an angle of 45 degrees. However, the velocity sensor-use transducer 6 of the velocity sensor-use transducer device 50 can be also arranged such that the vibration direction in which the vibrator of the sensor-use transducer 6 vibrates is tilted downward by an angle of 45 degrees with respect to the vehicle forward direction (i.e., heading direction of the vehicle). In such a case, in order for the velocity sensor-use transducers 5, 6 to also generate the notice sound toward the vehicle forward direction, the following condition is necessary. That is, it is necessary to designate the distance between the velocity sensor-use transducer 5 and the velocity sensor-use transducer 6 such that the sonic wave which goes to the vehicle forward direction from the velocity sensor-use transducer 6 and the sonic wave which goes to the vehicle forward direction from the velocity sensor-use transducer 5 accord with each other in respect of tops and bottoms of the amplitude.

In the second embodiment, the velocity sensor-use transducer 5 of the velocity sensor-use transducer device 50 is provided such that the vibration direction in which the vibrator of the sensor-use transducer 5 vibrates is tilted downward by an angle of 45 degrees with respect to the vehicle forward direction (i.e., heading direction of the vehicle). A minimum requirement of the velocity sensor-use transducer 5 is just to be able to transmit an ultrasonic wave towards a road surface and direct the notice sound towards the vehicle forward direction by the help of interference of the sonic waves. The angle of the velocity sensor-use transducer 5 can be arranged arbitrarily without need to be limited to an angle of 45 degrees.

In addition, in the first and second embodiments, the notice sound is generated only within a range in the vehicle forward direction; however, the vibration direction of the vibrator of each ultrasonic transducer can be provided so as to generate a notice sound within a range in the vehicle rearward direction or within ranges in the vehicle forward direction and the vehicle rearward direction.

It will be obvious to those skilled in the art that various changes may be made in the above-described embodiments of the present invention. However, the scope of the present invention should be determined by the following claims.

What is claimed:

1. A vehicle presence notification apparatus for reporting a presence of a vehicle to an outside of the vehicle, the apparatus comprising:
   an ultrasonic signal generation section that outputs an ultrasonic signal;
   a modulation section that uses the ultrasonic signal as a carrier wave and modulates the ultrasonic signal depending on an audible sound;
   a notice sound-use ultrasonic transducer device that generates a notice sound by emitting an ultrasonic wave in mid air based on the ultrasonic signal modulated by the modulation section; and
   a velocity sensor-use ultrasonic transducer device that functions as a vehicle velocity sensor by transmitting an ultrasonic wave to a road surface based on the ultrasonic signal emitted by the ultrasonic generation section or the ultrasonic signal modulated by the modulation section,
   the velocity sensor-use ultrasonic transducer device being further configured to include at least a first ultrasonic transducer and a second ultrasonic transducer, both of which transmit and receive an ultrasonic wave,
   wherein:
   an arrangement position of the first ultrasonic transducer is anterior to an arrangement position of the second ultrasonic transducer in a forward-and-rearward direction of the vehicle;
   an ultrasonic wave transmitted towards downward of the vehicle by the first ultrasonic transducer is reflected on a road surface, and the reflected ultrasonic wave is received by the second ultrasonic transducer;

an ultrasonic wave transmitted towards downward of the vehicle by the second ultrasonic transducer is reflected on a road surface, and the reflected ultrasonic wave is received by the first ultrasonic transducer; and a vehicle velocity of the vehicle is measured based on a first duration and a second duration, the first duration being defined as a duration from when an ultrasonic wave is transmitted by the first ultrasonic transducer to when the ultrasonic wave, which is transmitted by the first ultrasonic transducer and then reflected on a road surface, is received by the second ultrasonic transducer, the second duration being defined as a duration from when an ultrasonic wave is transmitted by the second ultrasonic transducer to when the ultrasonic wave, which is transmitted by the second ultrasonic transducer and then reflected on a road surface, is received by the first ultrasonic transducer.

2. The vehicle presence notification apparatus according to claim 1, the velocity sensor-use ultrasonic transducer device being further configured to emit the modulated ultrasonic wave towards at least one of a vehicle rearward direction of the vehicle or a vehicle forward direction of the vehicle.

* * * * *